United States Patent [19]

Hirsch

[11] 3,737,192
[45] June 5, 1973

[54] HINGED MOUNTING FOR TILT CAB

[75] Inventor: Walter Hirsch, Don Mills, Ontario, Canada

[73] Assignee: Massey-ferguson Industries Limited, Toronto, Ontario, Canada

[22] Filed: Oct. 12, 1971

[21] Appl. No.: 188,067

[52] U.S. Cl. .............................. 296/28 C, 180/89 A
[51] Int. Cl. ........................................... B62d 33/06
[58] Field of Search ........................ 296/28 C, 35 R; 180/89 A

[56] References Cited

UNITED STATES PATENTS 2,947,376 8/1960 Norrie .................................... 180/89
3,005,511 10/1961 Riedy .................................... 180/89

FOREIGN PATENTS OR APPLICATIONS 1,275,884 8/1968 Germany ........................... 296/35 R Primary Examiner—Leo Friaglia
Assistant Examiner—John A. Pekar
Attorney—Gerhardt, Greenlee & Farris

[57] ABSTRACT

A tilt cab is mounted at one end of a vehicle for downward tilting movement around a pivot axis and subsequent support on a lift member associated with the vehicle. A load damping and energy storing device is connected between the cab and the frame of the vehicle in such a manner as to be activated by upward movement of the lift member conjointly with the downward swinging of the tilt cab, to first dampen the movement of the tilt cab downwardly while simultaneously being loaded and thereafter exerting a hold-down force on said tilt cab to maintain secure shake-proof support of the cab on the lift member.

6 Claims, 4 Drawing Figures

INVENTOR.
WALTER HIRSCH

HINGED MOUNTING FOR TILT CAB

BACKGROUND AND SUMMARY OF INVENTION

The present invention relates to supporting mechanism for tilt cabs for vehicles and more in particular to a combined self-acting, load damping and hold-down mechanism for a tilt cab.

It has been known to provide vehicles which are equipped with an under-the-cab engine, with tilting cabs to permit easy and unobstructive access to the engine compartment of the vehicle. Such arrangements are quite common in heavy truck vehicles having the engine mounted above or behind the front axle.

It is also known to provide construction machines or other heavy equipment such as agricultural vehicles, which normally have an open operator's platform, with removable cab enclosures for protection of the operator and the operating controls on the platform against the weather.

As is known, construction machines and agricultural machines are of generally large dimensions and sometimes of excessive height which on the construction site or open field terrain on which these machines operate normally causes no problems. However, these heavy machines have to be periodically transported from one area of operation to another via the road or railway by being placed on flattop trailers or railway cars.

During over-the-road or railroad transportation the height of these machines becomes critical in view of possible obstructions along the road or railway, particularly tunnels or overpasses which have defined maximum clearance dimensions. Thus, in order to clear overpasses, tunnels or other obstructions along the road or railway, or to move the machine into a building, in many instances, has to be removed entirely prior to transport of the machine. This requires tedious and time consuming disassembly of the cab from the machine and subsequent reassembly at the point of destination.

It has been proposed herebefore to provide the cab with a tilting mechanism which permits the cab to remain on the machine by merely swinging the cab from its normal upright position downwardly towards the side or front of the machine. However, due to the extreme height of the operator's platform relative to the ground serious difficulties have been encountered herebefore in securely supporting the cab in its downward swinging position. This difficulty is further amplified by the extreme remote location of the center of gravity of the cab relative to the pivot of the cab.

Herebefore hydraulic or other fluid mechanisms have been proposed for swinging movement of the cab downwardly upon a suitable support without submitting the cab to impact or shock loads. These known mechanisms are costly and require additional fluid controls and fluid power line installations. Additionally, they may interfere with other machine components and at best are difficult to accommodate in existing machine structures.

An additional problem resides in securely retaining the tilted cab on the cab support during transport of the machine from one location to another so as to prevent the tilted cab from shaking and rattling which ultimately results in damage to the cab and cab support.

In known tilt cab mechanism of this type, the cab had to be manually secured onto the support by hold-down means-at added costs of the additional components and increased time and labor-in preparing the machine for transport over the road or rail.

In order to overcome the above mentioned drawbacks, the present invention provides improved mechanical means to effectively support the cab during tilting movement and to resiliently absorb any shock loads associated with the tilting movement. Thereafter, the same mechanical means are effectively utilized to securely hold the cab down upon the support to prevent the cab from shaking and rattling during transport.

Accordingly, it is the primary object of the present invention to provide improved cab support and hold-down means for a tilting cab which is completely mechanical and self-acting, inexpensive to manufacture and to install and requiring no fluid line and fluid control installations.

It is another object of the present invention to provide improved load supporting and resilient shock absorbing means for a tilt cap mechanism, while at the same time functioning as an effective hold-down means for the tilted cab.

A further object of the present invention resides in the provision of resilient load damping and shock absorbing means for a tilt cab mechanism which additionally functions as an energy storing device for subsequent use as a hold-down means.

The above objects and other novel features of the present invention will become fully apparent by reference to the following detailed description of a preferred embodiment thereof and when read in conjunction with the attached drawings.

BRIEF DESCRIPTION OF THE DRAWINGS

The accompanying drawings illustrate a preferred embodiment of the invention in which.

DETAILED DESCRIPTION OF THE INVENTION

Figure 1:
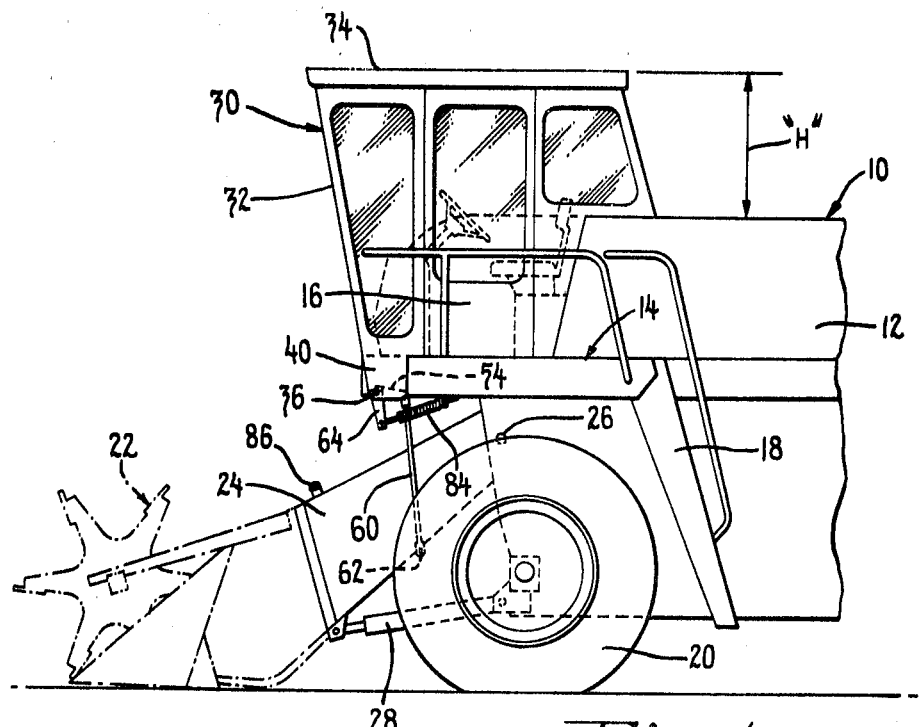
FIG. 1 is a fragmentary illustration of the front portion of an agricultural machine such as a combine showing the tilt cab of the present invention in its normal upright position.

With continuing reference to the drawings, FIG. 1 schematically illustrates the front end of an agricultural machine 10 such as a combine or the like.

The combine or other machine 10 includes a body or frame 12 including an elevated platform 14 at the extreme forward end of the machine. The platform 14 defines an operators station 16 accessible by mans of a ladder 18. The combine or other machine 10 as will be understood is supported by means of ground engaging wheels 20 (only one of which is shown) for travel over the ground.

Normally, the combine 10 or other machine is adapted to carry an implement 22 forwardly thereof which in operation of the machine 10 will be detachably secured to a combined hitch and elevator mechanism 24. Elevator 24 is pivotally supported on frame 12 as indicated at 26 for selective raising or lowering movement of elevator 24 relative to the ground by means of extendable links 28. Extendable links 28, which may be fluid motors or the like, are pivoted at one end to the machine 10 and at their other end to elevator 24.

In the present instance, the operator's station during operation of the machine 10 is enclosed by means of a cab 30 supported on the platform 14. The cab 30 has a front end 32 and a top 34 which extends a substantial distance "H" above the top of the combine or other machine 10 when the cab is in normal upright position as shown in FIG. 1.

As is known, the machine 10 such as a combine or the like is adapted for normal self-propelled operating movement over a field terrain but has to be periodically transported to different locations by means of over-the-road or railway carriers. In order to load the machine 10 onto the carrier platform the implement 22 is detached from the elevator 24. Although the flat bed carriers for the machine 10 are usually designed to have a height level relative to the ground over which they travel to permit free passage of the relatively high super structure of the machine 10 under any obstructions such as overpasses bridges or tunnels along the road or railway, no allowance was made for the cab 30 which, in normal position, extends above the super structure of the machine 10. Thus, in many instances, the cab 30 cannot pass through the designed clearance heights of overpasses or tunnels along the road or railway and therefore had to be removed from the machine 10 prior to transport.

Figure 2:
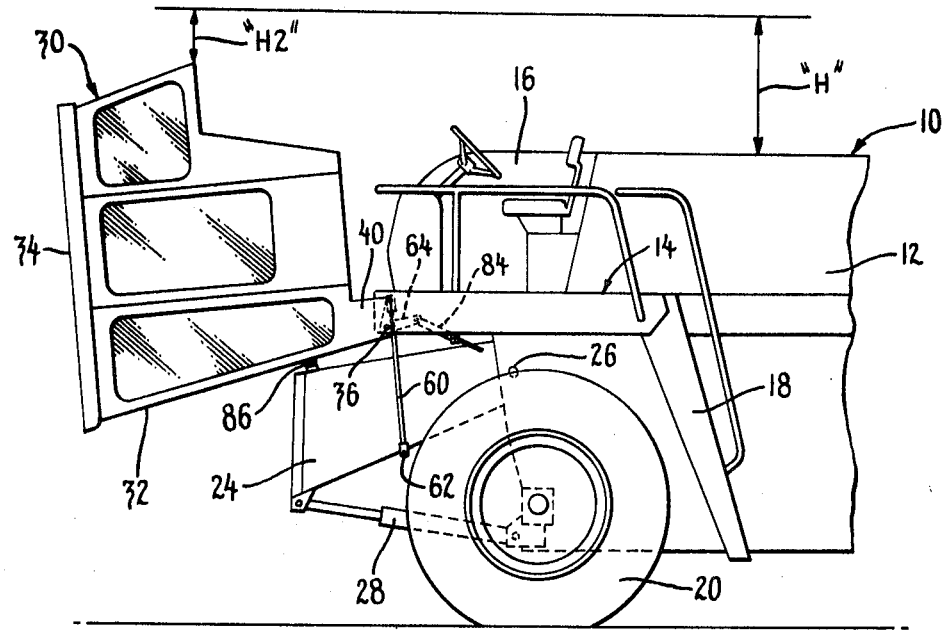
FIG. 2 is a similar fragmentary illustration of the front end of an agricultural vehicle showing the tilt cab in swung-down position upon a support associated with the vehicle.
Figure 3:
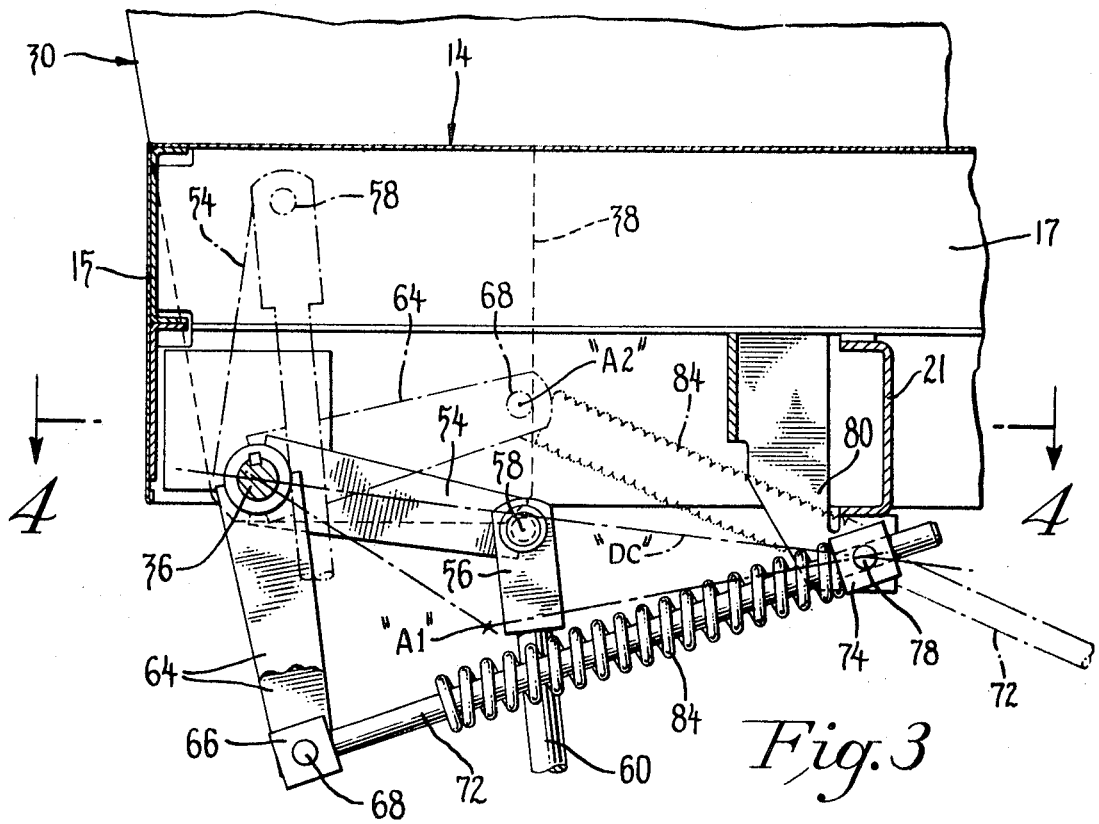
FIG. 3 is enlarged fragmentary cross-section through a frame portion of the front end of the machine illustrated in FIG. 1 and showing the present improved tilt cab load support and hold-down mechanism, more in detail.
Figure 4:
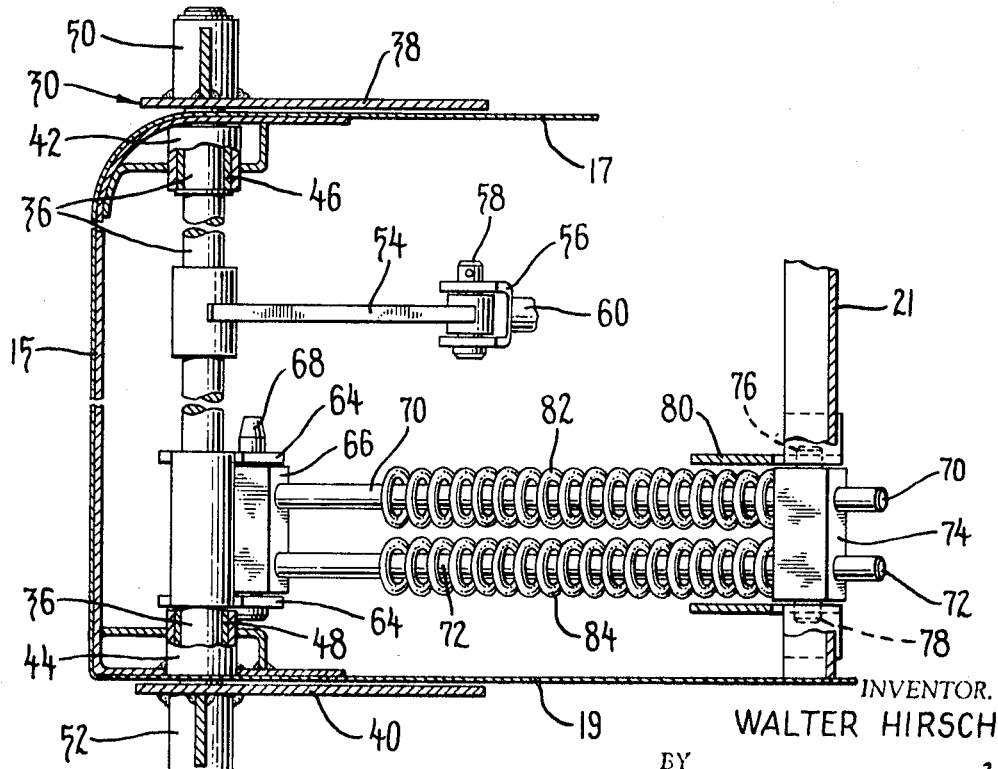
FIG. 4 is a top plan view of the mechanism shown in FIG. 3.

In accordance with the present invention, and with additional reference to FIG. 3 and 4, the cab 30 is pivotally attached to the platform 14 at the lower front end by means of a pivot shaft 36 to thereby permit the cab 30 to be swung forwardly and downwardly around the pivot shaft 36 as shown in FIG. 2. This reduces the overall height of the machine 10 to permit clearance through obstacles such as overpasses and tunnels.

With particular reference to FIG. 3 and 4 the platform 14 is composed of a frame assembly 15 having opposite side members 17 and 19 which are interconnected by a crossframe member 21.

The lower front end of cab 30 is provided with a downward extension comprised of opposite side members 38 and 40 respectively which straddle the front section of platform 14 outwardly of the side members 17 and 19 as most clearly shown in FIG. 4.

Side frame members 17 and 19 of platform 14 are inwardly provided with coaxially aligned boss portions 42 and 44 which each retain a bushing 46 and 48. Bushings 46 and 48 are provided to rotatively support pivot shaft 36 within the frame 15 of platform 14 for extension outwardly through both side frame members 17 and 19. The outer ends of pivot shaft 36 are received within cylindrical boss portions 50 and 52 secured to the outside of side members 38 and 40 of the lower cab extension. The outer ends of pivot shaft 36 are secured within their respective boss portions 50 and 52 by means of keys or the like (not shown) so that upon rotation of pivot shaft 36 within bushings 46, 48 cab 30 will be swung around the axis of the pivot shaft between a normal upright position shown in FIG. 1 and the tilted position shown in FIG. 2.

It shall be mentioned here that the cab 30 may weight around 500 pounds and has a center of gravity extremely remote from the axis of pivot shaft 36 so that upon tilting movement of the cab 30 forwardly and downwardly around pivot shaft 36, load absorbing and damping means are required for smooth movement and to prevent impact of the cab on its support.

In accordance with the invention, pivot shaft 36 is adapted to be rotated for tilting movement of cab 30 by means of a lever 54 which is keyed or otherwise secured to pivot shaft 36. Lever 54 radially extends from pivot shaft 36 and its end is pivotally attached by means of a yoke member 56 and pivot pin 58 to a rigid rod 60. Rod 60 extends downwardly towards elevator 24 to which the other end of rod 60 is pivotally attached as seen at 62 in FIG. 1 and 2. Rod 60 is movable longitudinally with swinging movement of elevator 24 for rotation of pivot shaft 36 as hereafter more thoroughly explained.

A second layer 64 is attached to pivot shaft 36 for rotation therewith within the confines of side frame members 17 and 19. Second lever 64 is angularly offset from lever 54 and is bifurcated to receive a pivot block 66 pivotally secured to the lower end of lever 64 by means of pin 68.

It shall be noted here that levers 54 and 64 are substantially equal length such that the respective pivots 58, 68 are moved along a common arc described around the axis of pivot shaft 36 for a purpose to be described hereafter.

Pivot block 66 of lever 64 is adapted to support one end of a pair of rods 70 and 72 disposed adjacent to each other and in parallel relationship for extension rearwardly from lever 64. The rearends of rods 70, 72 extend slidingly through a rear pivot block 74 which is pivotally retained by means of aligned trunnions 76, 78 within the lower ends of a bracket 80 fastened to the frame of platform 14 rearwardly of shaft 36. Rods 70, 72 are conjointly slidable within pivot block 74 for a purpose to appear hereafter.

Each of the rods 70, 72 supports a compression spring 82 and 84 respectively of identical length. One end of each of the compression springs, 82, 84 is anchored to the rear pivot block 74 whereas the opposite ends of the springs—opposite from pivot block 66—remain unattached. It will be noted that in the normal in-place position of the cab 30 (FIG. 1) and as shown in solid lines in FIG. 3, the free ends of compression springs 82, 84 are a distance apart from pivot block 66 so that under normal operating conditions of cab 30 springs 82, 84 remain unloaded in freely expanded position.

In the present instance, springs 82—84 have identical spring force characteristics. However, it will be understood that a single spring may be employed or any number of springs depending on the weight of the cab and location of its center of gravity relative to its pivot point.

In operation of the device of the present invention, in order to swing cab 30 forwardly and downwardly on machine 10, elevator 24 is actuated for upward swinging movement around its pivot 26 by means of fluid motors 28. Upward movement of elevator 24 causes similar upward movement of rod 60 which is attached to elevator 24 at pivot point 62. Longitudinal upward movement of rod 60 causes angular displacement of lever 54 to thereby rotate pivot shaft 36 in counterclockwise direction (in the drawings) by means of attachment of the lower front end extension 38–40 of cab 30 to the outer ends of pivot shaft 36. Cab 30 will then be rotated forwardly around the axis of pivot shaft 36 simultaneously with raising of elevator 24. Thus, upon actuation both members, elevator 24 and cab 30, are rotatably moved in an approaching direction towards each other as pivot shaft 36 is rotated by lever 54 and associated rod 60, the second lever 64 which is likewise attached to pivot shaft 36 will be angularly advanced the same distance in correspondence with the rotating movement of lever 54. Angular rotating movement of lever 64 causes the rods 70–72 to be longitudinally displaced through rear pivot block 74 to thereby move the front pivot block 66 into abutment against the free ends of springs 82–84. Continuing angular displacement of lever 64 by further upward movement of the elevator 24 results in compression springs 82–84 between opposite pivot blocks 66 and 74 to effectively dampen the downward movement of cab 30 onto the raising elevator 24 to thereby prevent the cab against free falling and eliminate impact shock loads upon engage-ment of the cab 30 with the elevator 24.

Maximum upward movement of elevator 24 conjointly with pivotal downward movement of cab 30 ultimately results in complete com-pression of springs 82-84 substantially at a point "A1," just prior to full supporting engagement of cab 30 upon the elevator 24.

After full compression of springs 82-84 at point "A1," final upward movement of elevator 24 cause the springs 82-84 to be moved, through dead center, indicated by line "DC," towards point "A2." The dead center of the compression spring assembly of the present improved mechanism is defined by a line "DC" drawn through the axes of pivot shaft 36 and trunnions 76–78. In this position cab 30 is fully engaged upon elevator 24 to be supported thereby.

With reference back to FIG. 1 and 2, preferably antifriction means such as rollers 86 are provided between the front end 32 of the cab 30 and the top of elevator 24 to permit sliding rolling, engagement of the cab upon the supporting elevator 24. Conveniently, rollers 86 are attached to the top of elevator 24 and preferably comprise a spaced pair of rollers for engagement against opposite side edges along the front 32 of cap 30 as shown in FIG. 2.

Compression springs 82–84 of the present invention comprise an energy loading device which upon full compression of the spring and being at the position "A2" beyond dead center "DC" in FIG. 3 tend to expand at a predetermined force magnitude in counterclockwise direction against lever 64 to thereby exert a constant rotating force on pivot shaft 36. By this action the tilted cab 30 is effectively clamped down upon the supporting elevator 24 and securely held in clamped down position by continuous expansion force of the compressed springs 82–84 so as to prevent the tilted cab from shaking and rattling upon its supporting member 24 during transport of the machine 10 over the road or rail. By this arrangement, which is a subsequent function of the present improved compression spring load supporting and shock absorbing assembly, no additional clamp-down means need to be employed to securely retain the cab 30 in tilted position upon the supporting elevator 24. This provides a considerable saving of material cost and labor.

As will be noted from the foregoing, the shock load damping and clampdown function of the present improved device is completely automatic and self-acting in response to the respective rotated position of pivot shaft 36.

With reference again to FIG. 2, the cab 30 in the forwardly tilted position upon the raised support elevator 24, reduces the former overall height "H," as indicated by the respective reference lines in FIG. 1 and 2, by a substantial distance "H2" indicated at the left FIG. 2. This position in many instances may already be sufficient to provide safe clearance for transport of the machine 10 underneath overpasses or through tunnels. However, if further height reduction is necessary, the actuating rod 60 may be detached from elevator 24. Thereafter elevator 24 can be further lowered taking the cab 30 with it which is maintained in rigid supporting engagement with elevator 24 by means of the combined expansion force of springs 82–84 acting on lever 64 from the position "A2" in FIG. 3 to rotate pivot shaft 36 counterclockwise, i.e., in direction of downward movement of the cab 30.

In order to return cab 30 to its normal upright position in FIG. 1, elevator 24 is raised upwardly to the point of reattachment of actuator rod 60 to elevator 24. Further upward movement of elevator 24 causes compression springs 82–84 to be moved past dead center "DC" in return direction from point "A2" to a point "A1" at which the expansion force of springs 82–84 now exert a force in clockwise direction upon lever 64 to aid in returning the cab 30 to its normal upright position shown in FIG. 1.

It will be obvious from the foregoing description in connection with the appended drawings that the present improved tilt cab mechanism provides a multifunctional device which is completely self-acting to provide (first) a load supporting and shock adsorbing means on the way down; (secondly) a hold-down means after engagement of the tilted cab upon the support and; (thirdly) a cab return means upon return movement of the cab to its normal position.

Although the present invention has been described by means of a preferred embodiment it would be obvious to the person skilled in the art to make various changes and modifications in detail and arrangement without departing from the spirit and essential characteristic of the invention as defined by the scope of the appended claims.

What is claimed is:

1. In combination with a vehicle having a chassis including an operator station and a tilting cab normally enclosing said operator station and pivotally movable between a normal enclosing position and a transport position remote from said operator station; characterized by first support means for said tilt cab associated with said vehicle and pivotally attached to said chassis for movement between a lowered and a raised position; a pivot shaft supported for rotation on said chassis for connection of said tilt cab to said chassis; a first lever attached to said pivot shaft; a second lever attached to said pivot shaft in angular offset position relative to said first lever; linkage means between said first lever and said first support means; second support means for said tilt cab attached to aid chassis; means operatively connecting said second support means with said second lever; actuator means for raising of said first support means towards said tilting cab; said second support means comprising an energy storing and load supporting device; said first support means upon actuation by said actuator means being effective to rotate said pivot shaft by means of said first lever and said linkage means to tilt said cab forwardly towards said first support means and simultaneously activated said second support means by means of said second lever connected to said pivot shaft whereby said energy storing and load supporting device of said second support means is effective to maintain said tilt cab in substantially rigid rest position upon said first support means.

2. The combination as defined in claim 1, characterized by provision of anti-friction means for support of said tilt cab upon said first support means.

3. The combination as defined in claim 1, further characterized by a pivot block attached to said chassis rearwardly of said pivot shaft; said means connecting said second support means with said second lever comprising a rod pivotally attached to said lever and slidingly supported within said pivot block; said energy storing and load supporting device of said second support means comprising spring means associated with said rod; the axis of said pivot shaft and said pivot block defining a dead center; said spring means being normally in unloaded condition with said cab is in normal enclosing position whereby upon actuation of said first support means said spring means will be gradually compressed and moved through said dead center to thereby exert a downward clamping force of predetermined magnitude on said cab to maintain substantially rigid engagement between said first support means and said cab.

4. In a vehicle, a frame, a tilt cab mounted for tilting movement thereon; cab tilting means connected to said frame and said cab for movement of said cab between a raised and a lowered position; characterized by load absorbing energy storing means; actuator means for actuating said tilting means and said load absorbing energy storing means; said load absorbing energy storing means including an overcenter linkage and at least one spring operatively connected between said cab and said frame so that upon activation of said tilting means said cab will be caused to tilt to said lowered position and said load absorbing energy storing means will first absorb load during movement of said cab towards said lowered position and thereafter will exert said load on said cab to maintain said cab in said lowered position.

5. The tilt cab mechanism of claim 4 characterized by said cab tilting means comprising a support member mounted for pivotal movement towards said cab as the latter tilts towards said lowered position for supporting engagement with said cab in said lowered position.

6. The tilt cab mechanism of claim 5 characterized in that said vehicle comprises a combine and said cab tilting means comprises an elevator.

\* \* \* \* \*